(12) United States Patent
Shi et al.

(10) Patent No.: US 11,777,586 B2
(45) Date of Patent: Oct. 3, 2023

(54) METHODS AND WIRELESS COMMUNICATION DEVICE FOR CARRYING OUT BEAM FAILURE RECOVERY

(71) Applicant: ZTE Corporation, Guangdong (CN)

(72) Inventors: Xiaojuan Shi, Shenzhen (CN); Eswar Kalyan Vutukuri, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/907,809

(22) Filed: Jun. 22, 2020

(65) Prior Publication Data

US 2020/0322035 A1  Oct. 8, 2020

Related U.S. Application Data

(63) Continuation of application No. PCT/CN2017/117937, filed on Dec. 22, 2017.

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0626* (2013.01); *H04L 5/0051* (2013.01);
(Continued)

(58) Field of Classification Search
CPC .... H04B 7/088; H04B 7/0626; H04B 7/0639; H04B 7/0695; H04B 7/061; H04B 7/0408;
(Continued)

(56) References Cited

U.S. PATENT DOCUMENTS

| 2014/0098783 A1* | 4/2014 | Wan | ....................... | H04L 5/0073 |
| | | | | 370/330 |
| 2014/0177607 A1* | 6/2014 | Li | ........................ | H04B 7/0695 |
| | | | | 370/336 |

(Continued)

FOREIGN PATENT DOCUMENTS

CN  107079459 A  8/2017

OTHER PUBLICATIONS

Ericsson, "R1-1714295 ,On the use of SS for beam management and beam recovery", 3GPP,TSG-RAN WG1 #90,Aug. 25, 2017 (8 pages).

(Continued)

*Primary Examiner* — Ajit Patel
*Assistant Examiner* — Wilfred Thomas
(74) *Attorney, Agent, or Firm* — Foley & Lardner LLP

(57) ABSTRACT

Methods and a wireless communication device for carrying out beam failure recovery include, according to various implementations, using a beam failure recovery request media access control-control element (BFRR MAC CE) to transfer beam failure recovery information (e.g., from one node of a wireless network to another—such as from a mobile wireless communication device to a base station (BS)). The BFRR MAC CE may include one or more of: the reference signal (RS) type (i.e., the type of RS resource), the identity of the RS resource, the identity of a frequency location (e.g., the identity of a bandwidth part in cases where bandwidth part (BWP) is used), and the identity of the serving cell.

15 Claims, 9 Drawing Sheets

| R | SCellIndexID | bandwidth PartID | Oct 1 |
| RS | SSB index/CSI-RS resource ID | | Oct 2 |

(51) Int. Cl.
*H04L 5/00* (2006.01)
*H04W 56/00* (2009.01)
*H04W 72/044* (2023.01)
*H04W 74/08* (2009.01)
*H04W 80/02* (2009.01)

(52) U.S. Cl.
CPC ......... *H04L 5/0092* (2013.01); *H04W 56/001* (2013.01); *H04W 72/046* (2013.01); *H04W 74/0833* (2013.01); *H04W 80/02* (2013.01)

(58) Field of Classification Search
CPC ... H04L 5/0051; H04L 5/0092; H04L 5/0053; H04L 5/001; H04L 5/0048; H04W 56/001; H04W 72/046; H04W 74/0833; H04W 80/02
See application file for complete search history.

(56) References Cited

U.S. PATENT DOCUMENTS

| | | | | |
|---|---|---|---|---|
| 2015/0327268 | A1* | 11/2015 | Susitaival | H04W 72/0446 370/336 |
| 2016/0323049 | A1* | 11/2016 | Zhang | H04W 16/14 |
| 2017/0207843 | A1* | 7/2017 | Jung | H04B 7/063 |
| 2017/0347380 | A1* | 11/2017 | Islam | H04W 52/365 |
| 2018/0070368 | A1* | 3/2018 | Quan | H04L 1/1822 |
| 2018/0235013 | A1* | 8/2018 | Jung | H04W 16/28 |
| 2018/0302889 | A1* | 10/2018 | Guo | H04B 7/0617 |
| 2019/0074891 | A1* | 3/2019 | Kwon | H04W 56/0005 |
| 2019/0089442 | A1* | 3/2019 | Akoum | H04L 5/005 |
| 2019/0174346 | A1* | 6/2019 | Murray | H04W 72/046 |
| 2019/0261383 | A1* | 8/2019 | Kwak | H04L 1/1607 |
| 2019/0387438 | A1* | 12/2019 | Chang | H04W 36/08 |
| 2019/0387446 | A1* | 12/2019 | Xu | H04W 8/14 |
| 2020/0120714 | A1* | 4/2020 | Wang | H04B 7/088 |
| 2020/0389220 | A1* | 12/2020 | Kang | H04W 74/0833 |

OTHER PUBLICATIONS

Interdigital, Inc., "R1-1720631, Remaining issues on beam recovery", 3GPP, TSG-RAN WG1 Meeting #91, Dec. 1, 2017 (6 pages).
International Search Report on PCT/CN2017/117937 dated Aug. 29, 2018 (3 pages).
Mediatek Inc., "R1 -1718334, Design Details on Beam Failure Recovery", 3GPP TSG-RAN WG1 Meeting #90bis, Oct. 13, 2017 (8 pages).
First Office Action for JP Appl. No. 2020-534279, dated Nov. 2, 2021 (with English translation, 12 pages).
First office Action for KR Appl. No. 10-2020-7020734, dated Nov. 15, 2021 (with English translation, 10 pages).
Huawei et al.: "non-contention based random access for beam failure recovery in CA" 3GPP TSG-RAN WG2#AH-1801; R2-1801049; Jan. 26, 2018; Vancouver, Canada (3 pages).
Huawei et al.: "RAN2 aspects of DL beam management" 3GPP TSG-RAN WG2 Meeting NR#2; R2-1706718; Jun. 29, 2017; Qingdao, China (6 pages).
Huawei et al.: "RAN2 aspects of DL beam management" 3GPP TSG-RAN WG2#99bis; R2-1710562; Oct. 13, 2017; Prague, Czech Republic (4 pages).
Nokia et al.: "Beam indication, Measurements and Reporting" 3GPP TSG RAN WG1 Meeting #91; R1-1720890; Dec. 1, 2017;Reno, Nevada (13 pages).
Extended European Search Report for EP Appl. No. 17935576.3, dated Jun. 8, 2021 (13 pages).
Qualcomm Inc.: "Beam Recovery Request" 3GPP TSG-RAN WG2 Meeting #97bis; R2-1703562; Apr. 7, 2017; Spokane, USA (3 pages).
Samsung: "NR beam recovery" 3GPP TSG-RAN WG2 2017 RAN2#98 Meeting; R2-1705731; May 19, 2017; Hangzhou, China (5 pages).
First Office Action for JP Appl. No. 2020-534279, dated Jul. 5, 2022 (with English translation, 15 pages).
Qualcomm Incorporated, "PRACH Procedure Considerations" 3GPP TSG-RAN WG1 Meeting #90bis, R1-1718532, Oct. 13, 2017, Prague, Czech Republic (15 pages).
Decision of Rejection on JP Patent Application No. 2020-534279, dated Feb. 7, 2023 (with English translation, 14 pages).
Huawei et al., "Handling of Resources for Beam Failure Recovery", 3GPP TSG-RAN WG2 #99, R2-1708697, Aug. 25, 2017, Berlin, Germany (5 pages).
Extended European Search Report for EP Appl. No. 17935576.3, dated Mar. 28, 2023 (10 pages).
Qualcomm Incorporated, "Beam recovery procedure ", 3GPP TSG-RAN WG2 Meeting #97bis, R2-1703561, Apr. 7, 2017, Spokane, USA (4 pages).

* cited by examiner

METHODS AND WIRELESS COMMUNICATION DEVICE FOR CARRYING OUT BEAM FAILURE RECOVERY

TECHNICAL FIELD

The present disclosure is related generally to communication in wireless networks and, more particularly, to methods and a wireless communication device for carrying out beam failure recovery.

BACKGROUND

To target the ever-increasing need for bandwidth, next generation system wireless systems will adopt high operating frequencies—up to 100 GHz. When such high operating frequencies are used, propagation loss tends to be high. To address this issue, next generation wireless communication devices may employ antenna arrays and beamforming (BF) training technologies using massive multiple-in-multiple-out (MIMO) techniques (e.g., 1024 antenna elements for one node) in order to achieve beam alignment and obtain sufficiently high antenna gain.

Currently, wireless networks use physical random access channels (PRACH) for beam failure recovery. To make a PRACH-based beam failure recovery scheme work, a wireless network should explicitly or implicitly provide dedicated random access channel (RACH) resources associated with each candidate beam, i.e., each candidate reference signal (RS) resource. A candidate RS resource can be either a synchronization signal (SS) block or channel state information reference signal (CSI-RS) resource. However, these RACH resources for beam failure recovery are only used when the wireless communication device's serving beam pair link(s) fails. Thus, reserving these resources all the time results in waste of these radio resources. This is especially true in the case of dedicated RACH resources, which are used for non-contention based random access (i.e., these resources are exclusively reserved for each wireless communication device). RACH resource(s) dedicated to the purpose of beam failure recovery should be configured for the possible candidate beams (and information regarding such configuration should be known to the wireless devices on the network) prior to beam failure. These dedicated resource(s) should be orthogonal to other PRACH transmissions that the wireless device may carry out (i.e., PRACH transmissions that the wireless device makes for other purposes) and should also be orthogonal to the dedicated RACH resource(s) configured for other wireless devices.

DRAWINGS

While the appended claims set forth the features of the present techniques with particularity, these techniques, together with their objects and advantages, may be best understood from the following detailed description taken in conjunction with the accompanying drawings of which:

Figure 6:
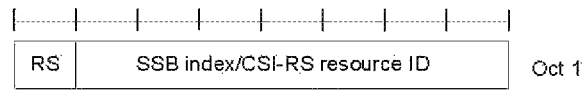
Figure 7:
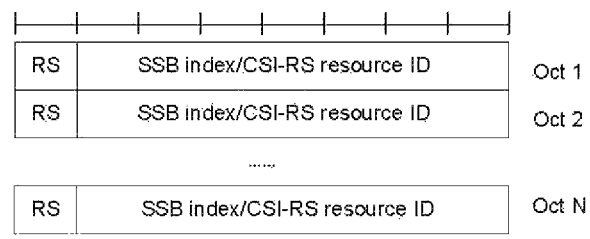
Figure 8:
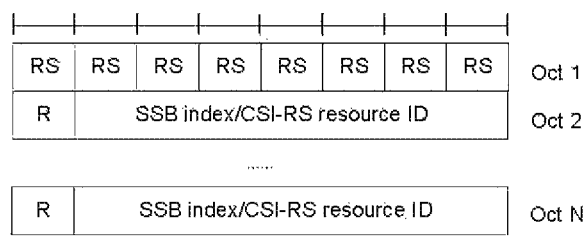

FIG. 6, FIG. 7, and FIG. 8 illustrate possible implementations of the BFRR MAC CE, according to an embodiment.

Figure 9A:
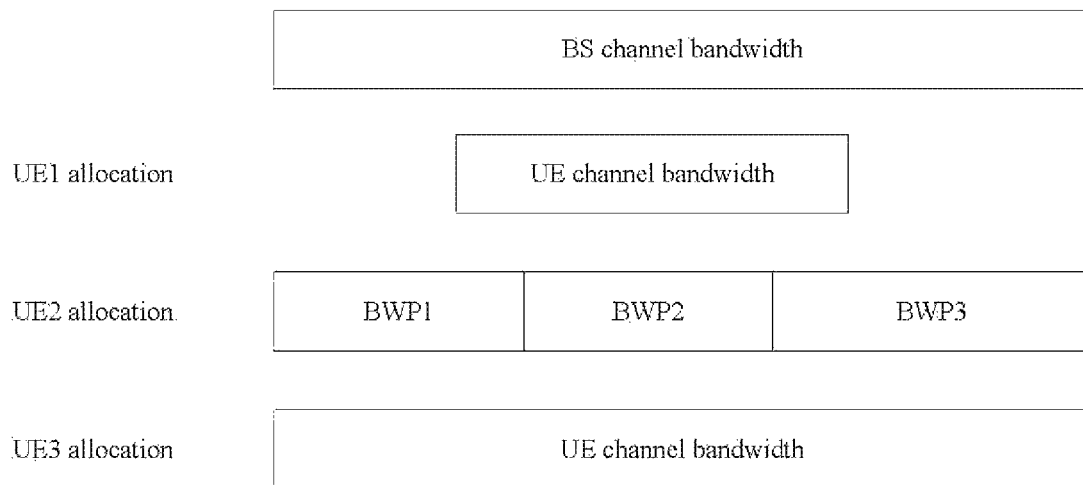
Figure 9B:
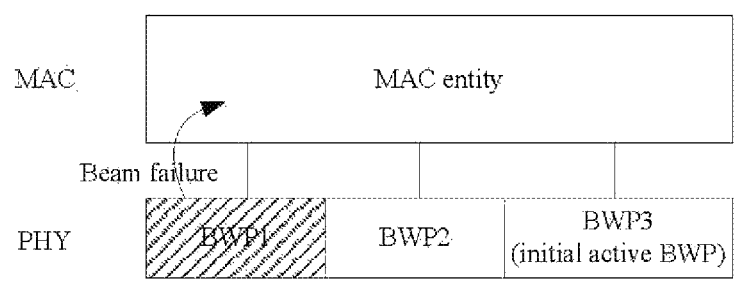

FIG. 9A and FIG. 9B illustrate BWP communication.

Figure 10:
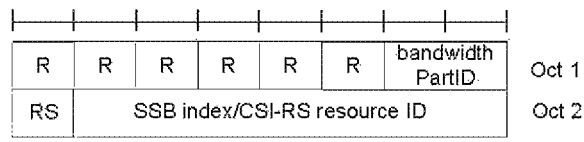

FIG. 10 illustrates a BFRR MAC CE that includes only the best candidate RS resource, according to an embodiment.

Figure 11:
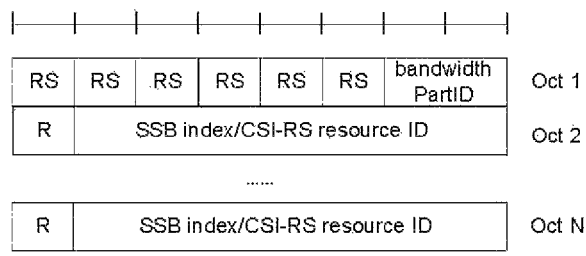
Figure 12:
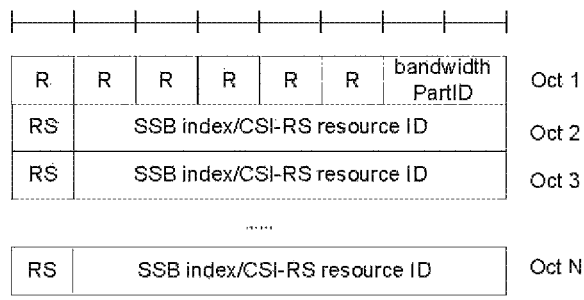

FIG. 11 and FIG. 12 illustrate two possible BFRR MAC CE examples that include more than one candidate RS resources, according to an embodiment.

Figure 13:
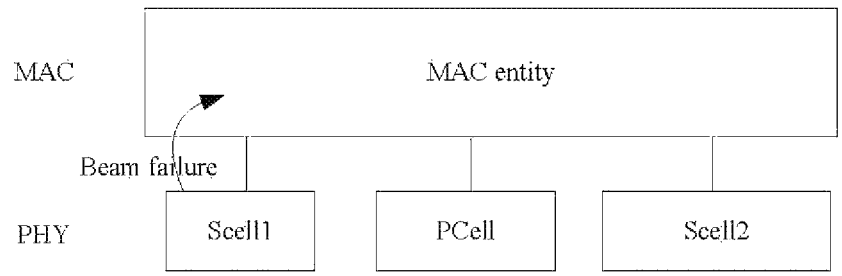

FIG. 13 illustrates carrier aggregation.

Figure 14:
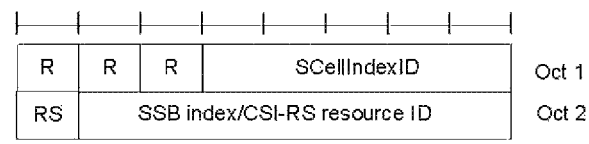

FIG. 14 illustrates a BFRR MAC CE according to an embodiment, which includes only the best candidate RS resource.

Figure 15:
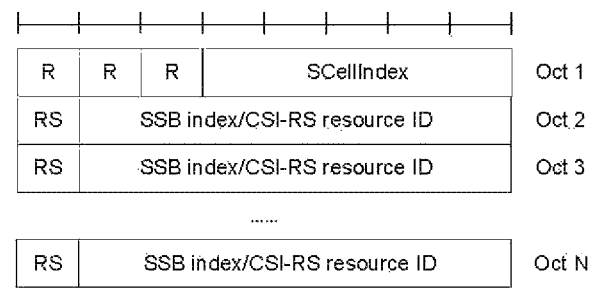
Figure 16:
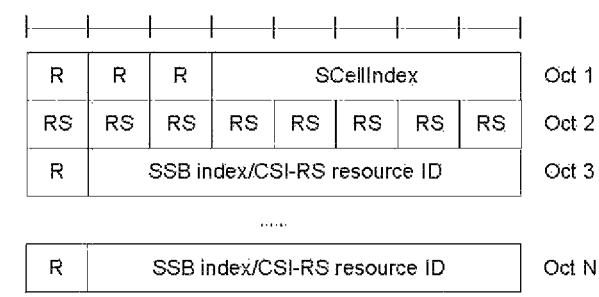

FIG. 15 and FIG. 16 illustrate two possible BFRR MAC CE examples that include more than one candidate RS resources, according to an embodiment.

Figure 17:
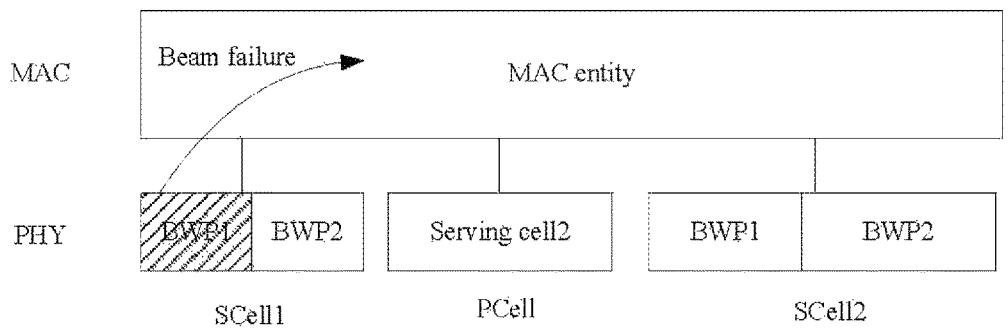

FIG. 17 illustrates a communication device configured with a PCell and two SCells.

Figure 18:
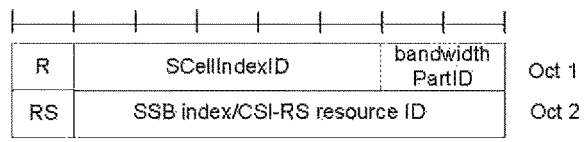

FIG. 18 illustrates a BFRR MAC CE that includes only the best candidate RS resource, according to an embodiment.

Figure 19:
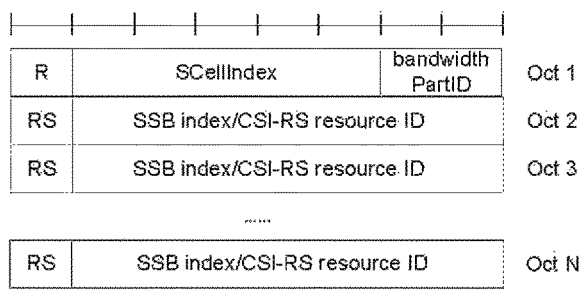
Figure 20:
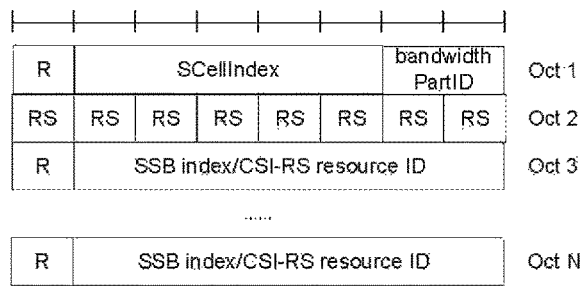

FIG. 19 and FIG. 20 illustrate two possible BFRR MAC CE examples that include more than one candidate RS resource, according to an embodiment.

DESCRIPTION

The present disclosure is generally directed to methods and wireless communication device for carrying out beam failure recovery. According to an embodiment, a beam failure recovery request media access control protocol-control element (BFRR MAC CE) is used to transfer beam failure recovery information (e.g., from one node of a wireless network to another—such as from a mobile wireless communication device to a base station (BS)). The BFRR MAC CE may include one or more of: the reference signal (RS) type (i.e., the type of RS resource), the identity of the RS resource, the identity of a frequency location, e.g., the identity of a bandwidth part (in cases, for example, where bandwidth part (BWP) is used), and the identity of the serving cell, e.g., the identity of the secondary serving cell.

In an embodiment, a wireless communication device may include, within the BFRR MAC CE: (1) only the best candidate RS resource that the communication device identified, (2) one or more qualified candidate RS resources that the communication device identified, or (3) up to a maximum number of N candidate RS resources that the communication device identified.

According to an embodiment, the RS resource (e.g., the beam) is either an SS block (SSB) (identified, for example, by SSB index number) or a channel state information reference signal (CSI-RS) resource. If more than one candidate RS resource is included in the BFRR MAC CE, each RS type bit in the BFRR MAC CE indicates the RS type of the corresponding RS resource.

In an embodiment, a "qualified" candidate RS resource refers to a RS resource whose quality, for instance RSRP, is above a threshold.

In an embodiment, the BFRR MAC CE is signaled to the network (e.g., signaled by a mobile wireless communication device to a BS) on the uplink (UL) resources signaled from the network. Such UL resources may be UL resources that were allocated to the MAC entity (e.g., allocated to the MAC layer of the wireless communication device) before the beam failure occurs. For instance, if the beam failure declaration is assessed in the MAC entity, the "before the beam failure occurs" refers to a time before the MAC entity declares the beam failure to have occurred. If the beam failure declaration is assessed in another layer of the wireless communication device other than the MAC entity, "before the beam failure occurs" refers to a time before the MAC entity receives a beam failure indication from the layer in which the failure was assessed. The layer of the wireless communication device that assessed the beam failure can be either the physical layer (e.g., the physical layer of the wireless communication device) or a higher layer (e.g. the radio resource control (RRC) layer of the wireless communication device). In various embodiments, the UL resources may be allocated by the network after the network receives the scheduling request (SR) from the wireless communication device or may be allocated by the network in a response to a random access request made by the wireless communication device.

According to an embodiment, when beam failure occurs, e.g., in response to the reception of a beam failure indication from the layer that declares the beam failure or when the MAC entity determines that beam failure occurs, if there are no dedicated RACH resources associated with any of the candidate beams for beam failure recovery, the wireless communication device does the following:

(1) If the MAC entity (of the wireless communication device) has UL resources allocated for new transmission at that time, the wireless communication device signals the BFRR MAC CE on the UL resources. (2) If there are no UL resources allocated for new transmission at that time but there are valid Physical Uplink Control Channel (PUCCH) resources for SR configured on any of the other normal operation active BWPs or on any of the other normal operation serving cells, the MAC entity instructs the physical layer to signal a SR. The physical layer then signals the BFRR MAC CE on the UL resources that are allocated by the network as a result of receiving the SR. (3) If there are neither UL resources allocated for new transmission at that time nor valid PUCCH resources for SR configured on any of the other normal operation active BWPs or on any of the other normal operation serving cells, the wireless communication device initiates a contention-based random access and signals the BFRR MAC CE on the UL resources that are allocated by the network in the random access response.

In an embodiment, the wireless communication device may use a legacy procedure, such as a contention based RACH over the candidate beams, and include an explicit indication via MAC CE if the candidate beam has contention based RACH resources.

According to an embodiment, after the BFRR MAC CE is signaled, the MAC entity monitors a physical downlink control channel (PDCCH) addressed to the Cell Radio Network Temporary Identifier (C-RNTI) of the wireless communication device.

In an embodiment, if the best RS resource is included in the BFRR MAC CE, the MAC entity monitors the PDCCH on the best candidate beam. If a PDCCH transmission addressed to the C-RNTI is received on the best candidate beam, the communication device considers the beam failure recovery procedure successfully completed.

According to an embodiment, if the qualified candidate RS resource(s) are included in the BFRR MAC CE, then the communication device monitors the PDCCH on these qualified candidate RS resource(s). If a PDCCH transmission addressed to the C-RNTI of the wireless communication device is received on any of the qualified candidate RS resource(s), the communication device consider the beam failure recovery procedure successfully completed.

In an embodiment, if up to a maximum number of N candidate RS resources that are identified by the communication device are included in the BFRR MAC CE, then the communication device monitors the PDCCH on all of these N candidate RS resources. If a PDCCH transmission addressed to the C-RNTI of the wireless communication device is received on any of the N candidate RS resources, the communication device considers the beam failure recovery procedure successfully completed.

According to an embodiment, the BS explicitly indicates, via RRC signaling to the wireless communication device, which type of BFRR MAC CE the wireless communication device is supposed to use. The communication device adopts the BFRR MAC CE type according to the BS indication.

Figure 1:
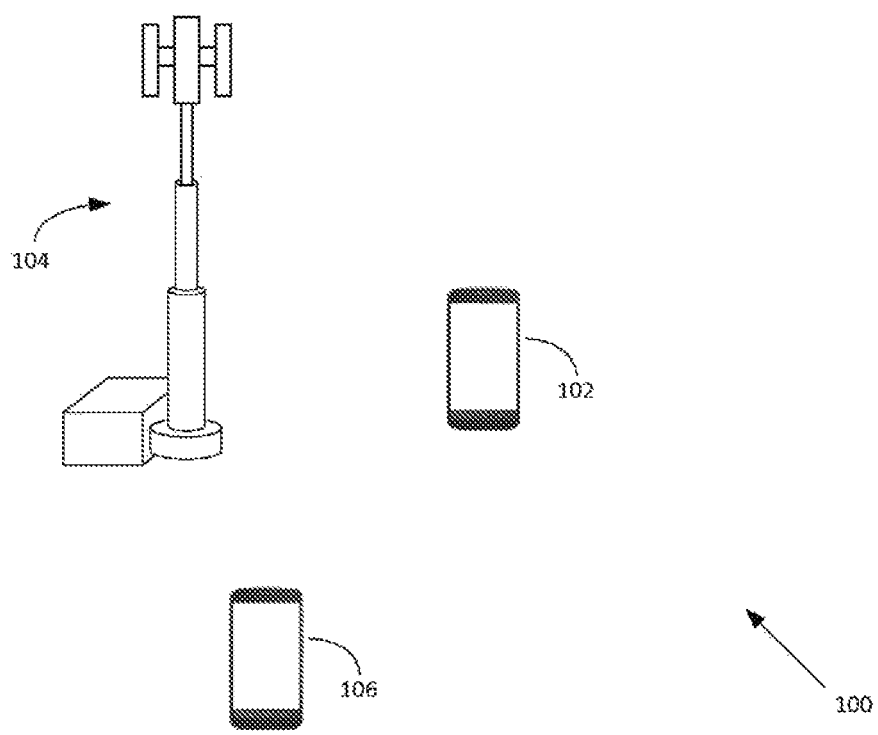
FIG. 1 depicts a wireless communication system in which the various embodiments described herein may be implemented.

FIG. 1 depicts a wireless communication system 100 in which the various embodiments described herein may be implemented. The communication system 100 includes several wireless communication devices ("wireless communication device" will sometimes be shortened herein to "communication device" or "device" for convenient reference). The communication devices depicted are a first communication device 102 (depicted as a user equipment (UE)), a second communication device 104 (depicted as a base station), and a third communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other base stations, other UEs, wireless infrastructure, wired infrastructure, and other devices commonly found in wireless networks. Possible implementations of the communication devices include any device capable of wireless communication, such as a smartphone, tablet, laptop computer, and non-traditional devices (e.g., household appliances or other parts of the "Internet of Things").

When operating as part of a wireless communication system, a wireless communication device may be referred to as a "wireless network node." Furthermore, in order to describe the communication between a BS and another communication device (such as a UE), the non-BS device will often be referred to as a "wireless communication device" (or "communication device") to differentiate it from the BS even though a wireless BS is also a type of "wireless communication device."

Additionally, the MAC layer of a wireless communication device will sometimes be referred to herein as a "MAC entity" (i.e., media access control entity). This terminology helps to express the interaction between the MAC layer and other layers, such as the physical layer or the RRC layer, of the wireless communication device. It is to be understood that, when the disclosure refers to a MAC entity or a physical layer or the RRC layer carrying out an action, it is the wireless communication device that is carrying out the action.

Finally, it is to be understood that, in various embodiments, one or more wireless network nodes receive, process, and respond to the BFRR MAC CE described herein. For example, a network node may receive a MAC CE indicating the identity of one or more candidate beam(s), identify a candidate beam based on the contents of the MAC CE, and transmit a response to the wireless communication device on the identified candidate beam.

Figure 2:
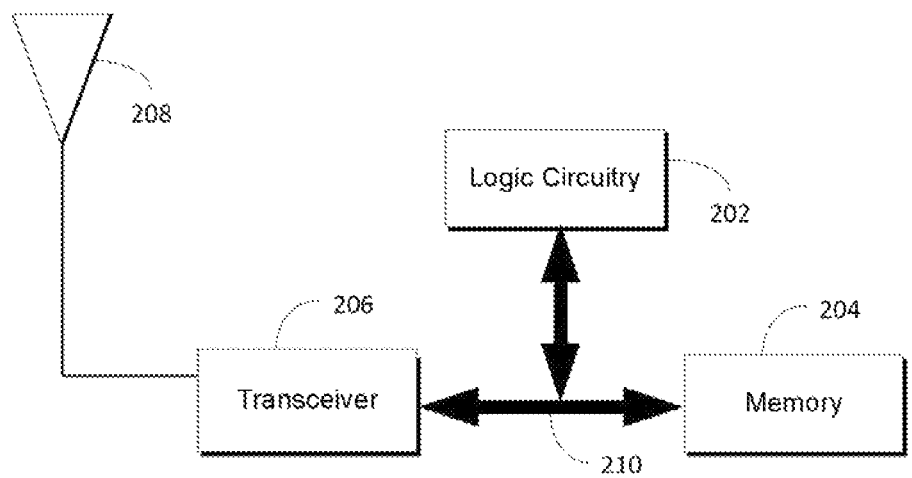
FIG. 2 illustrates a basic hardware architecture implemented by each of the wireless communication devices of FIG. 1, according to an embodiment.

FIG. 2 illustrates a basic hardware architecture implemented by each of the wireless communication devices of FIG. 1, according to an embodiment. The elements of FIG. 1 may have other components as well. The hardware architecture depicted in FIG. 2 includes logic circuitry 202, memory 204, transceiver 206, and one or more antennas represented by antenna 208 (including transmit antennas and/or receive antennas). The memory 204 may be or include a buffer that, for example, holds incoming transmissions until the logic circuitry is able to process the transmission. The memory 204 may be implemented, for example, as a non-transitory computer-readable medium having stored thereon computer-executable instructions for carrying one or more of the methods described herein. The elements of FIG. 2 are communicatively linked to one another via one or more data pathways 210. Examples of data pathways include wires, conductive pathways on a microchip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Figure 3:
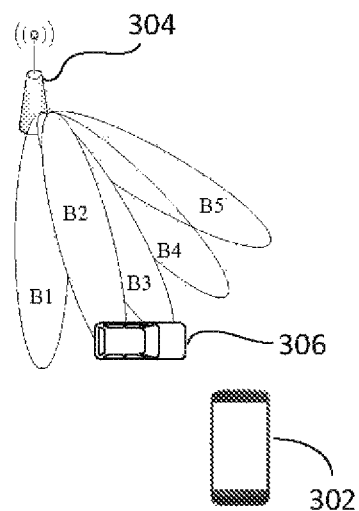
FIG. 3 and FIG. 4 illustrate two beam failure cases.
Figure 4:
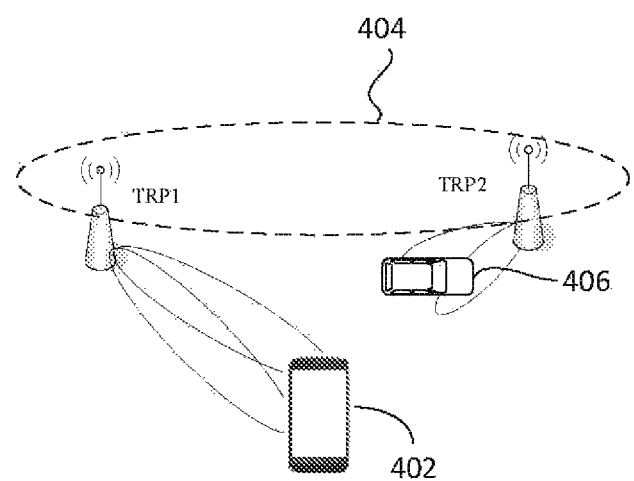

Although there are a variety of existing methods for (re)acquiring beam alignment between a transmitter and a receiver as the wireless link between the two changes, there may be cases in which the receiver may suffer from blockage events that could result in sudden sharp drops in signal strength (e.g., due to physical objects blocking the receiver-transmitter link). In such a case, beam failure occurs. FIG. 3 and FIG. 4 illustrate two beam failure cases.

In FIG. 3, a communication device 302 is currently in the coverage of one transmission/reception point (TRP) 304 and is being served by the TRP 304 with beam2 (B2) and beam3 (B3). Then with the appearance of a car (physical object) 306, the signal strengths of B2 and B3 drop suddenly and this results in beam failure.

In FIG. 4, a communication device 402 is currently in the coverage of TRP1 and TRP2. TRP1 and TRP2 are two TRPs connecting to the same base station (BS) 404, e.g., connecting to the baseband unit (BBU) or the central unit of the BS 404. And the communication device is being served by the beams radiated from TRP2. Then, with the appearance of a car 406, the signal strength of the beams from TRP2 drops suddenly and this again results in the beams' failure.

Receiver-transmitter beam pair links operating on high frequencies are very sensitive to the radiation environment. With the appearance/disappearance of obstacles and the rotation and movement of the handset receiver, beam failure will occur from time to time as described above. Chances are, in many cases, there are feasible/alternative beams to replace current blocked or misaligned serving beam(s) and to allow the communication device to recover from beam failure. So the communication device will search ways to recover from beam failure in order to maintain connectivity to the network.

A beam failure recovery procedure can include four phases: beam failure detection, identification of new candidate/alternative/feasible beam (referred to as "candidate beam"), transmission of beam failure recovery information to the network (e.g., to the BS), i.e., beam failure recovery procedure, and monitor the network's response to the beam failure recovery information.

Beam failure detection: During this phase, the communication device monitors the current serving beam quality (e.g., based on a reference signal such as the CSI-RS) to assess whether the quality is above a predetermined threshold. If the quality falls below the threshold, then the trigger condition for detecting beam failure is considered to have been met. The trigger condition for detecting beam failure can be, for example, the number of consecutive detected beam failure instances exceeding a configured maximum number on all serving beams. And a beam failure instance can refer to, for example, the case where the quality of beam pair link(s) of the associated control channel falls low enough (e.g., in comparison with a threshold or time-out of an associated timer). The above-described trigger condition can be assessed in the physical layer of the communication device. In this case, when the physical layer detects a beam failure, it sends a beam failure indication to the MAC entity. Alternatively, each of the beam failure instances can be assessed in the physical layer. However, the declaration of the beam failure event is carried out in a higher layer, e.g., in the RRC layer or in the MAC entity itself. The physical layer indicates each instance of beam failure to the higher layer. The higher layer declares that beam failure occurs if at least the maximum number of consecutive beam failure instance indications are received from the physical layer. In this case, if the higher layer is the RRC layer, when the RRC detects that beam failure occurs, it sends a beam failure indication to the MAC entity.

Identification of new candidate/alternative/feasible beam: Subsequent to detecting a beam failure as described above, the communication device measures and identifies new beams with good quality. These new beams are referred as candidate beams. Identification of candidate beams is based on measuring the signal strength/quality of reference signals (RS) transmitted over the candidate beams. These RS can be SS blocks and/or CSI-RS. A beam is chosen to be a candidate beam if, for example, the signal quality/strength of the measured RS is above a predetermined threshold.

Transmission of beam failure recovery information to the network: Subsequent to identifying a beam failure, if at least one candidate beam is identified, the beam failure recovery procedure is triggered. The beam failure recovery procedure is triggered by the MAC entity if the beam failure declaration is performed in MAC and the MAC entity determines that beam failure occurs. The beam failure recovery procedure may also be triggered by MAC layer upon it receiving a beam failure indication from another layer as noted above. Upon triggering a beam failure recovery procedure, the MAC entity triggers a random access procedure. The random access procedure can be either be contention free or contention based. In both cases, the network identifies the candidate beam according to the association between the RACH resources and beams. Note that a candidate beam can correspond to an SS block or a CSI-RS resource. Based on the received RACH message and based on the association of the RACH resource to the candidate beam, the network (e.g., the BS) understands the identity of the candidate beam.

Network response: Once the network receives the RACH signal over the candidate beam, the Network responds the UE by transmitting a message over the PDCCH (e.g. a downlink allocation or an UL grant) addressed to UE's C-RNTI and sent on the identified candidate the beam. With the reception of this network response, the procedure for beam recovery is considered to be complete.

In the above-described mechanism, the candidate beam is indicated to the network via the association between RACH resources and SS blocks/CSI-RS resources. The RACH resource associated with each candidate SS block should be explicitly provided by the network. However, as noted previously, providing RACH resources results in a large overhead, especially in the case of dedicated RACH resources which are used for non-contention based random access, i.e., these resources are reserved for a specific UE. The various embodiments described herein address these issues.

According to an embodiment, a method for recovering from beam failure involves the network not configuring RACH resources on some of the candidate beams. This reduces the signaling overhead that would otherwise result with using RACH resources on all candidate beams. Thus, RACH resources on another beam (e.g. contention based RACH resources) should be used by the UE to recover from beam failure. In order to indicate the best candidate beam to the network in this case, the UE includes an explicit indication of the candidate beam identity during the RACH procedure.

According to one embodiment, the wireless communication device uses a BFRR MAC CE (sometimes referred to as MAC CE), as noted previously. In various embodiments, the MAC CE includes at least the RS type and the identity of RS resource(s). In addition, in some embodiments, the identity of the frequency location (e.g., bandwidth part) and/or identity of serving cell can be included in the MAC CE. The BFRR MAC CE may include (a) Only the best candidate beam that the communication device identified, (b) the qualified candidate beam(s) that the communication device identified, or (c) up to a maximum number of N candidate beams that the communication device identified. Instead of a MAC CE, any other indication (e.g., a physical layer indication over an uplink control channel such as PUCCH) may be used to explicitly indicate the candidate beam identity.

In various embodiments, a wireless communication device identifies one or more candidate beams for beam recovery and generates a MAC CE including the identity of one or more of these candidate beams in response to the reception of a beam failure indication from the physical layer. Some basic network scenarios in which this may occur are as follows:

Case 1: Single serving cell without the operation of BWP,
Case 2: Single serving cell with the operation of BWP,
Case 3: (a) Multiple serving cells without the operation of BWP on any serving cell, or (b) multiple serving cells with the operation of BWP, but only one active BWP is allowed at a given time on each serving cell, and
Case 4: Multiple serving cells with the operation of BWP, and more than one active BWP is allowed at a given time on each serving cell.

Embodiments directed to each of these cases will now be described.

Case 1: Single Serving Cell Without the Operation of BWP

In an embodiment, the communication device monitors the CSI-RS to determine whether there is a beam failure event. If a beam failure is detected, the communication device will monitor SS blocks and/or CSI-RS resources to identify the possible candidate beams. Typically, SS blocks are transmitted with a wider bandwidth and thus can cover a wide area within a cell and serve more communication devices. In contrast, the CSI-RS are transmitted with a narrower bandwidth thus can provide high spatial resolution within a cell, and consequently serve fewer communication devices. SS blocks can be considered as a cell-specific RS, while CSI-RS can be considered as a communication device-specific configured RS that are not always-on transmitting but can be turned on/off efficiently. Common RACH resources for beams may only be configured associated to SS blocks while dedicated RACH resources can be configured associated to either SS blocks or CSI-RS resources. Common RACH resources are shared by communication devices accessing the cell. If provided, dedicated RACH resources configured to a communication device may not be reused by other communication devices.

According to an embodiment, common RACH resources associated to SS blocks must be provided to the communication device. Dedicated RACH resources, in contrast, are only configured to a communication device when necessary. For instance, dedicated RACH resource(s) for the purpose of beam failure recovery should be orthogonal to the other PRACH transmissions used by the communication device for other purposes, and be orthogonal to the dedicated RACH resource(s) configured for the purpose of beam failure for other communication devices. Thus, the network will not provide dedicated RACH resources associated to each SS block/CSI-RS to the communication device in the very beginning Instead, the network may just provide dedicated RACH resources associated to the possible candidate beams according to the beam management quality reports received in uplink. However, radio properties of high frequency signals may change suddenly with the appearance of obstacles, rotation of the device, movement of the handset receiver, etc. So there can be cases in which, when beam failure occurs, the communication device cannot find any candidate beam (SS block or CSI-RS resource) that is configured with dedicated RACH resource(s).

In an embodiment, when beam failure occurs as noted above, if the communication device cannot find any candidate beam that is configured with dedicated RACH resource(s), the MAC entity can only select an SS block to initiate a contention based random access. In other words, the beam failure can only be recovered on the selected SS block, which typically has a lower spatial resolution than the CSI-RS. To let the network know the best candidate beam that the communication device identified, or the qualified candidate beam(s) that the communication device identified, or even all of the candidate beams that the communication device identified, the communication device can include a BFRR MAC CE in the UL grant that was scheduled in the Random Access Response.

Figure 5:
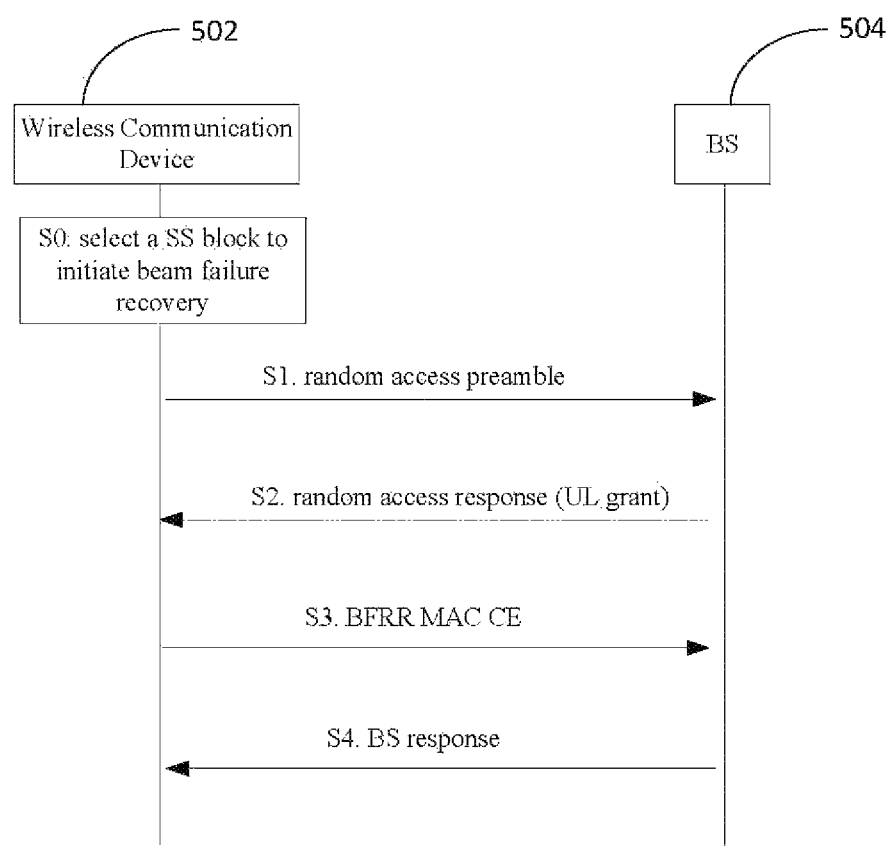
FIG. 5 illustrates a beam failure recovery procedure, according to an embodiment.

Turning to FIG. 5, a procedure according to an embodiment will now be described.

At S0: When beam failure occurs, e.g., with the reception of beam failure indication from the physical layer or RRC layer, the communication device 502 initiates a random access procedure. The communication device 502 first tries to find a candidate beam with dedicated RACH resource(s). Unfortunately, there is no such beam found. Thus, the communication device 502 selects an SS block (with good quality, e.g., with quality above a threshold) instead to initiate a contention based beam failure recovery procedure.

At S1 (Msg1): The communication device 502 transmits a random access preamble associated to the selected SS block to the BS 504.

At S2 (Msg2): With the reception of the random access preamble, the BS 504 identifies the SS block (the SS block selected by communication device) according to the association between the RACH resources and the SS blocks. The BS 504 sends a random access response to the communication device 502 on the identified SS block. An UL grant is included in the random access response. The communication device 502 monitors and receives the random access response from the BS 504 on the BS Tx beam corresponding to the selected SS block.

At S3 (Msg3): In response to the reception of the random access response, the communication device 502 includes the BFRR MAC CE in the subsequent uplink transmission according to the UL grant received in random access response. For the purpose of contention resolution, the C-RNTI MAC CE should be included in the uplink transmission at the same time.

At S4 (Msg4): The communication device 502 receives a response from the BS 504. If a PDCCH transmission addressed to the C-RNTI of the wireless communication device 502 is received from the BS 504, the communication device 502 considers the beam failure recovery procedure successfully completed. The communication device 502 monitors the PDCCH on the corresponding BS Tx beam(s) according to the candidate beam(s) that reported in the BFRR MAC CE. Here, a BS Tx beam refers to either a SS block or a CSI-RS resource.

In an embodiment, if the best candidate beam is included in the BFRR MAC CE, then the communication device 502 monitors the PDCCH on the best candidate beam. If a PDCCH transmission addressed to the C-RNTI is received on the best candidate beam, the communication device 502 considers the beam failure recovery procedure successfully completed.

In an embodiment, if the qualified candidate beam(s) are included in the BFRR MAC CE, then the communication device 502 monitors the PDCCH on these qualified candidate beam(s). If a PDCCH transmission address to the C-RNTI is received on any of the qualified candidate beam(s), the communication device 502 considers the beam failure recovery procedure successfully completed. Here, a qualified candidate beam refers to a beam (either a SS block or a CSI-RS resource) whose quality, for instance RSRP, is above a threshold. The threshold is provided by the BS 504 or specified in the communication specification. Besides the threshold, the BS 504 can also provide the maximum number (e.g., M) of allowed qualified candidate beams to be included in addition. If provided, then up to M qualified candidate beams can be included in the BFRR MAC CE.

According to an embodiment, if up to a maximum number of N candidate beams that identified by the communication device are included in the BFRR MAC CE, then the communication device monitor the PDCCH on all of these N candidate beams. If a PDCCH transmission address to the C-RNTI is received on any of the N candidate beams, the communication device consider the beam failure recovery procedure successfully completed. Here, the maximum number N is provided by the BS or specified in the specification.

In this way, instead of beam recovery only on a SS block with low spatial resolution, the network can acquire the information of the best candidate beam, or qualified candidate beam(s), or up to a maximum number of N candidate beams, and chances are the beam failure can be recovered on a CSI-RS with high spatial resolution.

Referring to FIG. 6, FIG. 7, and FIG. 8, possible implementations of the BFRR MAC CE according to an embodiment will now be described. As indicated above, just the best candidate beam, or the qualified candidate beam(s), or up to a maximum number of N candidate beams can be included in the MAC CE. If only the best candidate beam in included in the BFRR MAC CE, the identity of the best RS resource (i.e., the identity of the best candidate beam) and the RS type of the best RS resource is included in the BFRR MAC CE. If more than one candidate beam is included in the BFRR MAC CE, RS type(s) and identity(ies) of RS resource(s) are included in the BFRR MAC CE. Each RS type bit in the MAC CE indicates the RS type of the corresponding RS resource.

According to an embodiment, an RS type (denoted as RS for short in all the examples below) represents the reference signal type of the corresponding RS resource. For instance, RS type set to "1" indicates the corresponding RS resource is SS block. Thus, the corresponding identity of RS resource is the identity of SS block (denoted as SSB index in the illustrated examples below). An RS type set to "0" indicates the corresponding RS resource is a CSI-RS resource. Thus, the corresponding identity of an RS resource is the identity of a CSI-RS resource (denoted as CSI-RS resource ID in the examples below).

Assuming 7 bits length for the field of each identity of RS resource (e.g., 7 bits for identification of the resource, such as the SS block index (SSB) or the CSI-RS resource ID), FIG. 6 illustrates the BFRR MAC CE including only the best candidate RS resource, according to an embodiment. FIG. 7 and FIG. 8 illustrate two possible BFRR MAC CE examples which include more than one candidate RS resources, according to an embodiment.

As can be seen in the example of FIG. 6, the MAC CE occupies one Octet. The RS type bit is set in the right most bit of the Octet. The remaining 7 bits is the identity of the best candidate RS resource. In the examples of FIG. 7 and FIG. 8, the actual Octet occupied depends on the number of candidate RS resources included.

In FIG. 7, the RS type bits are set in the right most bits of each Octet. The remaining 7 bits in each Octet is the identity of the corresponding RS resource.

In FIG. 8, the RS type bits are set in the first one or more Octets. The number of the RS bits depends on the number of candidate RS resources included. The R bit is a reservation bit. The BFRR MAC CE for Case 1 is denoted herein as a Type1 BFRR MAC CE. It should be noted that the 7 bits length for the identity of RS resource is just an example. The length of the SSB index and CSI-RS resource ID can be the same or different, and actual length depends on the actual system design.

Case 2: Single Serving Cell with the Operation of BWP

In legacy systems, when allocating channel bandwidth, the channel bandwidth relates to the transmit and receive bandwidths of both the BS and all of the communication devices with which the BS communicates. For newer generation radio systems, however, different communication device channel bandwidths may be supported within the same spectrum. This is called bandwidth part (BWP) operation. In BWP operation, the communication device performs RF adaptation through center frequency tuning, bandwidth adaptation, or both, on a wideband carrier. BWP allows for reduced communication device bandwidth capability within a wideband carrier, allows for reduced communication device power energy consumption by bandwidth adaptation, and allows a communication device to use different numerologies in frequency division multiplexing (FDM) within a wideband carrier.

For instance, as illustrated in FIG. 9A, the BS is operating with a wide BS channel bandwidth. However, different communication devices can be configured with different channel bandwidths. For example, a narrow band UE1 can be allocated with just one part of the whole BS channel bandwidth. UE2 with carrier aggregation capability or with wideband capability can be allocated with more than 1 BWPs (e.g., 3 BWPs). UE3 with wideband capability can be allocated the whole BS channel bandwidth. Meanwhile, for a single communication device, the allocated BWP can be changed according to the required data rate. For instance, if the communication device is transmitting at a low data rate, then a smaller BWP can be configured to the communication device. Instead, if the communication device requires a high data rate, a wider BWP can be configured to the communication device. Different BWPs can be configured with different numerologies, e.g., with different sub-carrier spacing.

In currently implementations, although multiple BWPs (both for downlink (DL) and UL) can be configured to a communication device, only one of them (both for DL and UL) may be activated at a given time. Among multiple BWPs, there is at least an initial DL BWP and initial UL BWP. The network will configure RACH resources on the initial UL BWP but for other BWPs, it cannot be assumed that there will always be RACH resources.

In an embodiment, if beam failure occurs on an active DL BWP, and there is a candidate beam(s) of the active BWP configured with dedicated RACH resources, the MAC entity can initiate a contention free random access. The candidate beam can be identified according to the RACH resources associated with the candidate beam which is selected by MAC entity for transmitting the random access preamble. Or else, if there is no candidate beam configured with dedicated RACH resources on the active BWP but with candidate SS blocks which are associated with common RACH resources on this active BWP, then contention based random access can be performed on the active BWP. Or else, if there is neither a candidate beam configured with dedicated RACH resources nor candidate SS blocks associated with common RACH resources on the active BWP, then the communication device can fall back to the initial BWP to initiate a contention based random access. If contention based random access is initiated, the procedure illustrated in FIG. 5 and the same BFRR MAC CE illustrated in FIG. 6-FIG. 8 for Case 1 can be used by the wireless communication device to transfer the beam failure recovery information (e.g., to a BS).

However, as wireless technology develops further, e.g., the communication device may be able to operate with multiple numerologies at the same time, more than one BWP (both for DL and UL) may be activated at a given time. Then, if beam failure occurs on one active BWP, and there are no dedicated RACH resources associated with any of the candidate beams, another normal operating active BWP can be used to assist the beam recovery.

In FIG. 9B, for instance, the communication device is configured with three BWPs, BWP1-BWP3. BWP3 is the initial active BWP from which communication device access the base station. All the three BWPs are activated at the same time. Then (FIG. 9B), the physical layer (PHY) detects that beam failure event occurs on BWP1. But BWP2 and BWP3 are still in normal operation. PHY indicates the beam failure of BWP1 to the MAC entity.

According to an embodiment, when beam failure occurs, e.g., with the reception of a beam failure indication from PHY and if there is no dedicated RACH resources associated with any of the candidate beams of this beam failure BWP, the MAC entity (i.e., the wireless communication device) generates a BFRR MAC CE, which includes the identity of bandwidth part, the RS type(s), and the identity(ies) of RS resource(s). The identity of bandwidth part (denoted as bandwidthPartId in the examples below) indicates the BWP on which beam failure occurs. The same possibilities as in Case 1 can be used to include the RS type(s) and the identity(ies) of RS resource(s). That is, just the best candidate beam, or the qualified candidate beam(s), or up to a maximum number of N candidate beams can be included in the MAC CE.

For example, assume 7 bits length for the identity field of each RS resource, and assuming at most 4 BWPs (both for DL and UL) can be configured for a communication device, i.e., the bandwidthPartId is 2 bits. FIG. 10 illustrates the BFRR MAC CE with including only the best candidate RS resource, according to an embodiment. FIG. 11 and FIG. 12 illustrate two possible BFRR MAC CE examples that include more than one candidate RS resources, according to an embodiment. The BFRR MAC CE for Case 2 is denoted herein as a Type2 BFRR MAC CE.

According to an embodiment, when beam failure occurs, e.g., with the reception of beam failure indication on one of the active BWPs from PHY and if there is no dedicated RACH resources associated with any of the candidate beams of this beam failed BWP, the wireless communication device can use a normal operating active BWP to assist the beam recovery as follows:

If the MAC entity has available UL resources allocated for new transmission (e.g., from any of the other normal operation active BWPs) at that time (i.e., at the time beam failure occurs), the communication device signals the BFRR MAC CE using the UL resources. Otherwise, if there are no UL resources allocated for new transmission at that time but there is a valid PUCCH resource for a SR configured on any of the other normal operation active BWPs, the MAC entity instructs the physical layer to signal the SR on one of the active BWPs with a valid PUCCH resource for SR. With the reception of the SR, the BS responds with an UL grant that contains UL resources allocated for uplink transmission on this active BWP. With the allocated UL resources, the BFRR MAC CE can be signaled to the BS.

Otherwise, if there are neither UL resources allocated for new transmission at that time nor valid PUCCH resource for SR configured on any of the other normal operation active BWPs, a contention based random access can be initiated, and the BFRR MAC CE can be included in Msg3 as illustrated in FIG. 5 to transfer the beam failure recovery information.

Case 3: Multiple serving cells without the operation of BWP on any serving cell or Multiple serving cells with the operation of BWP, but only one active BWP is allowed at a given time on each serving cell.

A communication device with carrier aggregation (CA) capability can be configured with more than one serving cells. Among the configured serving cells, one is the primary serving cell (Pcell) while the others are secondary serving cells (SCell). All these serving cells share a common MAC entity. For instance, in FIG. 13, a communication device is configured with a PCell with two more SCells. The PCell and the two SCells share the same MAC entity. When operating with CA, the PCell is always activated, in other words, the PCell cannot be deactivated. The SCells can be activated/deactivated by the BS. More than one SCell can be activated at a given time. Each serving cell can operate with or without BWP. Here in this example, it is assumed that if operating with BWP, only one BWP is allowed to be activated at a given time on each serving cell.

In the embodiment, when the communication device is in CA operation, when beam failure occurs on one of the active serving cells, e.g., with the reception of beam failure indication from PHY as illustrated in FIG. 13, if there is no dedicated RACH resources associated with any of the candidate beams of this active serving cell, the MAC entity (of the wireless communication device) generates a BFRR MAC CE, which includes the identity of the serving cell, the RS type(s), and the identity(ies) of RS resource(s). The identity of serving cell (denoted as ScellIndexID in all the illustrated examples below) indicates the serving cell on which beam failure occurs. Again, the same possibilities discussed in Case 1 can be used to include the RS type(s) and the identity(ies) of RS resource(s). That is, just the best candidate beam, or the qualified candidate beam(s), or up to a maximum number of N candidate beams can be included in the MAC CE.

Assume, for example, 7 bits length for the identity field of each RS resource. Further assume at most 32 serving cells can be configured for a communication device, i.e., the ScellIndexID is 5 bits. FIG. 14 illustrates the BFRR MAC CE according to an embodiment, which includes only the best candidate RS resource. FIG. 15 and FIG. 16 illustrate two possible BFRR MAC CE examples which include more than one candidate RS resources, according to an embodiment. The BFRR MAC CE for Case 3 is denoted herein as a Type3 BFRR MAC CE.

In an embodiment, with the reception of beam failure indication on one of the active serving cells from PHY, and if there is no dedicated RACH resources associated with any of the candidate beams of this beam failed serving cell, the wireless communication device can use another normal operating active serving cell to assist the beam recovery as follows:

If the MAC entity has UL resources allocated for new transmission (e.g., from any of the other normal operation active serving cells) at that time, the communication device signals the BFRR MAC CE (e.g., to the BS) using the UL resources. Otherwise, if there are no UL resources allocated for new transmission at that time but there is a valid PUCCH resource for SR configured on any of the other normal operation active serving cells, the MAC entity (of the communication device) instructs the physical layer to signal the SR on one of the active serving cells using a valid PUCCH resource for SR. With the reception of SR, the BS responds with an UL grant that contains UL resources allocated for uplink transmission on this active serving cell. Using the allocated UL resources, the wireless communication device can signal the BFRR MAC CE to the BS.

Otherwise, if there are neither UL resources allocated for new transmission at that time nor valid PUCCH resources for SR configured on any of the other normal operation active BWPs, the wireless communication device can initiate a contention based random access and include the BFRR MAC CE in Msg3 as illustrated in FIG. 5 to transfer the beam failure recovery information.

Case 4: Multiple serving cells with the operation of BWP, and more than one active BWP is allowed at a given time on each serving cell.

In an embodiment, for further communication devices with carrier aggregation capability and at the same time with multiple activated BWPs simultaneously within a single serving cell, the communication device can be configured with more than one serving cell, and on each serving cell, more than one BWP can be in the active state at a given time. All these serving cells and BWPs share a common MAC entity. For instance, in FIG. 17, a communication device is configured with a PCell and two SCells. And on SCell1 and SCell2, two BWPs are activated simultaneously.

In this embodiment, when beam failure occurs on one of the active BWPs of one active serving cell, e.g., with the reception of beam failure indication from PHY as illustrated in FIG. 17, if there is no dedicated RACH resources associated with any of the candidate beams of this active BWP of the active serving cell, the MAC entity (of the wireless communication device) generates a BFRR MAC CE, which includes the identity of serving cell, the identity of the bandwidth part, the RS type(s), and the identity(ies) of RS resource(s). The identity of the bandwidth part (denoted as bandwidthPartId in all the illustrated examples below) and the identity of the serving cell (denoted as ScellIndexID in all the illustrated examples below) indicate the BWP of the serving cell on which beam failure occurs. Similarly, the same possibilities discussed above for Case 1 can be used to include the RS type(s) and the identity(ies) of RS resource(s). That is, just the best candidate beam, the qualified candidate beam(s), or up to a maximum number of N candidate beams can be included in the MAC CE.

Assume, for example, that there are 7 bits length for the identity field of each RS resource, 5 bits for ScellIndexID, and 2 bits for bandwidthPartId. FIG. 18 illustrates the BFRR MAC CE with including only the best candidate RS resource, in an embodiment. FIG. 19 and FIG. 20 illustrate two possible BFRR MAC CE examples which include more than one candidate RS resource, according to an embodiment. The BFRR MAC CE for Case 4 is denoted as herein as a Type4 BFRR MAC CE.

In an embodiment, with the reception of beam failure indication on one of the active BWP of one serving cell from PHY and if there is no dedicated RACH resources associated with any of the candidate beams of this beam failed BWP, the wireless communication device can use other normal operating active BWPs on this serving cell or the other normal operating active serving cells to assist the beam recovery as by carrying out the follow actions:

If the MAC entity has UL resources allocated for new transmission (e.g., from any of the other normal operation active BWP of this serving cell or from any of the other normal operation active serving cells) at that time, the communication device signals the BFRR MAC CE on the UL resources.

Otherwise, if there are no UL resources allocated for new transmission at that time but there is a valid PUCCH resource for SR configured on any of the other normal operation active BWP of this serving cell or on any of the other normal operation active serving cells, the MAC entity (of the wireless communication device) instructs the physical layer to signal the SR on one of the active serving cells with valid PUCCH resource for SR. With the reception of SR, the BS responds with an UL grant that contains UL resources allocated for uplink transmission on this active serving cell. Using the allocated UL resources, the wireless communication device can signal the BFRR MAC CE to the BS.

Otherwise, if there are neither UL resources allocated for new transmission at that time nor valid PUCCH resources for SR configured on any of the other normal operation active BWP of this serving cell or on any of the other normal operation active BWPs, the wireless communication device can initiate a contention based random access and include the BFRR MAC CE in Msg3 as illustrated in FIG. 5 to transfer the beam failure recovery information.

Described above are different types of BFRR MAC CE formats for different cases, according to various embodiments. A communication device may need to determine which type of BFRR MAC CE type to use. In an embodiment, regardless of whether the communication device is operating with carrier aggregation and/or BWP or not, the communication device always uses Type4 to transfer the beam failure recovery information. The communication device sets the bandwidthPartID bits and SCellIndex bits to zero. In this case, if the communication device is just operating with a single serving cell without the operation of BWP, the bits consumed by bandwidthPartID field and SCellIndex field are wasted.

In another embodiment, the communication device selects the type corresponding to the current working status. For example, if operating in Case 1, then the communication device selects Type1. If operating in Case 2, the communication device selects Type2, etc. In this case, the communication device behavior in this regard is out of the control of the network. However, there may be cases in which there is a misalignment between the understanding of communication device and the BS. In this way, beam failure recovery failure may occur. Thus, in another embodiment, the BS explicitly indicates the BFRR MAC CE Type in RRC signaling. And the communication device adopts the BFRR MAC CE Type according to the BS indication.

In some scenarios, for dual connectivity operation, a cell of a wireless network may function as a special cell (SpCell). A SpCell may refer to the primary cell (PCell) of the master cell group (MCG) or the primary secondary cell (PSCell) of the secondary cell group (SCG) depending on whether the MAC entity is associated with the MCG or with the SCG, respectively. Otherwise the term SpCell refers to the PCell. In an embodiment, when the MAC entity determines that the beam failure recovery fails, the wireless communication device does the following:

(1) If the beam failure occurs on a special cell (SpCell), the wireless communication device declares a radio link failure. (2) If the beam failure occurs on a secondary serving cell (SCell) other than the SpCell, the wireless communication device reports the SCell failure to the network. The wireless communication transmits the SCell failure to the network via the SpCell or via other normally operating SCells.

In an embodiment, the MAC entity starts a recovery timer when beam failure occurs, e.g., in response to the reception of a beam failure indication from the layer that declares the beam failure or when the MAC entity determines that beam failure occurs. If a PDCCH transmission addressed to the C-RNTI of the wireless communication device is received, e.g. in response to the BFRR MAC CE, the MAC entity stops and resets the recovery timer. The MAC entity determines that the beam failure recovery fails when the recovery timer expires. Or if a contention-based random access is initiated for the purpose of beam failure recovery as described above, and if the MAC entity has tried the allowed maximum number of random access attempts, the MAC entity determines that the beam failure recovery has failed.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

We claim:

1. A method for a wireless communication device for recovering from beam failure, the method comprising:
   in response to detecting a beam failure on a primary cell, identifying a candidate beam for recovering a radio link between the wireless communication device and a network node;
   transmitting an identity of the candidate beam in a media access control protocol control element to the network node;
   signaling the media access control protocol control element on uplink resources that are allocated for new transmission by the network node in a random access response, wherein the random access response is in a contention-based random access procedure;
   monitoring the candidate beam for a response by monitoring a physical downlink control channel (PDCCH) addressed to a Cell Radio Network Temporary Identifier (C-RNTI) of the wireless communication device;
   including, in the media access control protocol control element, an identity of a bandwidth Part (BWP) on which the beam failure occurred and an identity of a serving cell on which the beam failure occurred; and
   declaring a radio link failure if the recovering from beam failure on the primary cell fails.

2. The method of claim 1, wherein the identity of the candidate beams comprises an identity of a reference signal resource.

3. The method of claim 1, wherein the candidate beam is a synchronization signal or a channel state information reference signal.

4. The method of claim 1, further comprising:
   identifying the candidate beam to be a qualified candidate beam based on a determination that a quality of the candidate beam is above a threshold.

5. The method of claim 1, wherein the threshold is a reference signal received power threshold and wherein the threshold is received from a base station.

6. A wireless communication device comprising a processor, the processor being configured to:
   in response to detecting a beam failure on a primary cell, identify a candidate beam for recovering a radio link between the wireless communication device and a network node;
   transmit an identity of the candidate beam in a media access control protocol control element to the network node;
   signal the media access control protocol control element on uplink resources that are allocated for new transmission by the network node in a random access response, wherein the random access response is in a contention-based random access procedure;
   monitor the candidate beam for a response by monitoring a physical downlink control channel (PDCCH) addressed to a Cell Radio Network Temporary Identifier (C-RNTI) of the wireless communication device;
   include, in the media access control protocol control element, an identity of a bandwidth Part (BWP) on which the beam failure occurred and an identity of a serving cell on which the beam failure occurred; and
   declare a radio link failure if the recovering from beam failure on the primary cell fails.

7. A non-transitory computer-readable medium having stored thereon computer-executable instructions for causing a computer to:
   in response to detecting a beam failure on a primary cell, identify a candidate beam for recovering a radio link between the wireless communication device and a network node;
   transmit an identity of the candidate beam in a media access control protocol control element to the network node;
   signal the media access control protocol control element on uplink resources that are allocated for new transmission by the network node in a random access response, wherein the random access response is in a contention-based random access procedure;

monitor the candidate beam for a response by monitoring a physical downlink control channel (PDCCH) addressed to a Cell Radio Network Temporary Identifier (C-RNTI) of the wireless communication device;

include, in the media access control protocol control element, an identity of a bandwidth Part (BWP) on which the beam failure occurred and an identity of a serving cell on which the beam failure occurred; and declare a radio link failure if the recovering from beam failure on the primary cell fails.

8. The wireless communication device of claim 6, wherein the identity of the candidate beams comprises an identity of a reference signal resource.

9. The wireless communication device of claim 6, wherein the candidate beam is a synchronization signal or a channel state information reference signal.

10. The wireless communication device of claim 6, wherein the processor is further configured to:

identify the candidate beam to be a qualified candidate beam based on a determination that a quality of the candidate beam is above a threshold.

11. The wireless communication device of claim 6, wherein the processor is further configured to include, in the media access control protocol control element, an identity of a frequency location on which the beam failure occurred.

12. The non-transitory computer-readable medium of claim 7, wherein the identity of the candidate beams comprises an identity of a reference signal resource.

13. The non-transitory computer-readable medium of claim 7, wherein the candidate beam is a synchronization signal or a channel state information reference signal.

14. The non-transitory computer-readable medium of claim 7, further comprising computer-executable instructions for causing the computer to:

identify the candidate beam to be a qualified candidate beam based on a determination that a quality of the candidate beam is above a threshold.

15. The non-transitory computer-readable medium of claim 7, further comprising computer-executable instructions for causing the computer to include, in the media access control protocol control element, an identity of a frequency location on which the beam failure occurred.

* * * * *